United States Patent
Huang et al.

(10) Patent No.: US 9,322,923 B2
(45) Date of Patent: Apr. 26, 2016

(54) METHOD OF SWITCHING ELECTRONIC APPARATUS BETWEEN DIFFERENT MODES ACCORDING TO CONNECTION STATUS OF WIRELESS CONNECTION AND ELECTRONIC APPARATUS THEREOF

(75) Inventors: Kung-Shuan Huang, Changhua County (TW); Hsien-Chyi Chiou, Hsinchu (TW); Pao-Lin Wu, Taipei (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 1685 days.

(21) Appl. No.: 11/849,365

(22) Filed: Sep. 4, 2007

(65) Prior Publication Data

US 2009/0058719 A1     Mar. 5, 2009

(51) Int. Cl.
| | |
|---|---|
| H04B 1/16 | (2006.01) |
| G01S 19/34 | (2010.01) |
| G06F 1/32 | (2006.01) |
| H04B 1/3805 | (2015.01) |
| H04W 52/02 | (2009.01) |

(52) U.S. Cl.
CPC ............ G01S 19/34 (2013.01); G06F 1/3209 (2013.01); H04B 1/3805 (2013.01); H04W 52/0225 (2013.01); Y02B 60/50 (2013.01)

(58) Field of Classification Search
CPC .... H04W 52/25; H04W 52/288; H04W 52/24
USPC ................... 342/357, 457; 455/231
See application file for complete search history.

(56) References Cited

U.S. PATENT DOCUMENTS

| | | | |
|---|---|---|---|
| 5,592,173 A | 1/1997 | Lau | |
| 5,650,785 A | 7/1997 | Rodal | |
| 5,883,594 A | 3/1999 | Lau | |
| 6,133,871 A | 10/2000 | Krasner | |
| 6,584,331 B2 * | 6/2003 | Ranta | 455/574 |
| 6,650,896 B1 * | 11/2003 | Haymes et al. | 455/423 |
| 6,684,157 B2 * | 1/2004 | Barman et al. | 701/213 |
| 6,928,275 B1 * | 8/2005 | Patrick et al. | 455/256 |
| 7,035,731 B2 * | 4/2006 | Smith | 701/207 |
| 2005/0066006 A1 * | 3/2005 | Fleck | G06F 1/3203 709/206 |
| 2006/0050670 A1 * | 3/2006 | Hillyard | H04W 52/0251 370/338 |
| 2007/0157043 A1 | 7/2007 | Chien | |
| 2008/0090524 A1 * | 4/2008 | Lee | H04W 84/20 455/41.2 |
| 2009/0003252 A1 * | 1/2009 | Salomone | H04W 52/0229 370/311 |

FOREIGN PATENT DOCUMENTS

| | | |
|---|---|---|
| TW | 200712527 | 4/2007 |
| TW | 200726199 | 7/2007 |

* cited by examiner

*Primary Examiner* — Wesley Kim
*Assistant Examiner* — Richard Chan
(74) *Attorney, Agent, or Firm* — Winston Hsu; Scott Margo

(57) ABSTRACT

An electronic apparatus with power saving functionality is provided. The electronic apparatus includes a signal processing device configured for performing a predetermined signal processing operation; a wireless communication device coupled to the signal processing circuit for communicating with an external wireless communication device through a wireless connection; and a controller coupled to the signal processing device and the wireless communication device for switching the signal processing device between a first mode and a second mode according to a connection status of the wireless connection. The signal processing device operating in the second mode has less power consumption than the signal processing device operating in the first mode.

16 Claims, 2 Drawing Sheets

METHOD OF SWITCHING ELECTRONIC APPARATUS BETWEEN DIFFERENT MODES ACCORDING TO CONNECTION STATUS OF WIRELESS CONNECTION AND ELECTRONIC APPARATUS THEREOF

BACKGROUND

The present invention relates to reducing power consumption of an electronic apparatus and related method thereof, and more particularly, to an electronic apparatus with power saving functionality by switching a signal processing device between different modes according to a connection status of a wireless connection and related method thereof.

In general, a typical portable device uses a battery device as its main power supply. Therefore, due to the limited supply power, the greater is the power consumption, the shorter operating time of the portable device is. Taking a conventional portable GPS receiver for example, it provides positioning information for navigation according to received satellite signals after powered on. However, the portable GPS receiver keeps running in full power for performing its intended functions. However, a navigation application device that receives positioning information (NMEA data) generated from the GPS receiver does not have the navigation function enabled all the time. Therefore, in a case where the user of the navigation application device closes the navigation function, the conventional portable GPS receiver still keeps computing the positioning information while the navigation application device does not need the positioning information from the GPS receiver. As a result, the portable GPS receiver wastes much power on computing the positioning information, resulting in shorter operating time. Extending the operating time of the portable GPS receiver becomes an important topic for designers.

SUMMARY

It is therefore one of the objectives of the present invention to provide an electronic apparatus with power saving functionality by switching a signal processing device between different modes according to a connection status of a wireless connection and related method thereof.

According to one aspect of the present invention, an electronic apparatus with power saving functionality is provided. The electronic apparatus includes: a signal processing device, configured for performing a predetermined signal processing operation; a wireless communication device, coupled to the signal processing circuit, for communicating with an external wireless communication device through a wireless connection; and a controller, coupled to the signal processing device and the wireless communication device, for switching the signal processing device between a first mode and a second mode according to a connection status of the wireless connection, wherein the signal processing device operating in the second mode has less power consumption than the signal processing device operating in the first mode.

According to another aspect of the present invention, a method of controlling an electronic apparatus is provided. The method includes: monitoring a connection status of a wireless connection between the electronic apparatus and an external wireless communication device; and switching the electronic apparatus between a first operation mode and a second operation mode according to the connection status of the wireless connection, wherein the electronic apparatus operating in the second operation mode has less power consumption that the electronic apparatus operating in the first operation mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
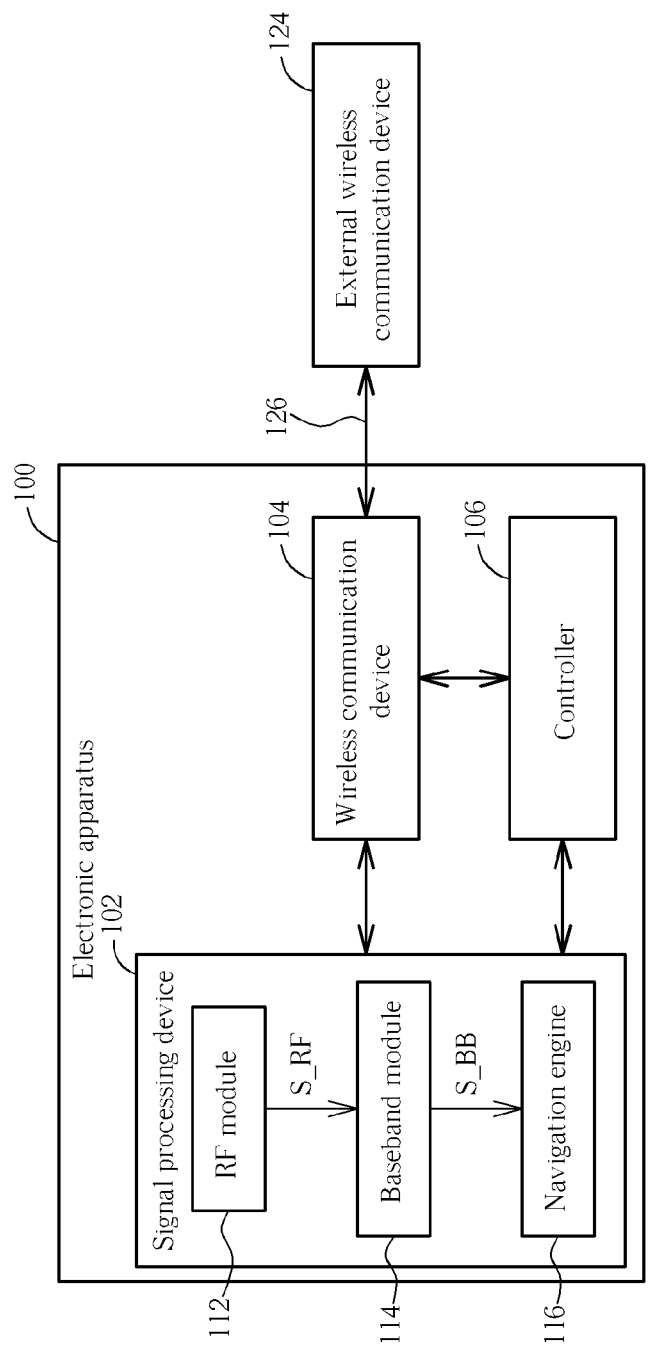
FIG. 1 is a block diagram illustrating an electronic apparatus with power saving functionality according to an exemplary embodiment of the present invention.

Please refer to FIG. 1. FIG. 1 is a block diagram illustrating an electronic apparatus 100 with power saving functionality according to an exemplary embodiment of the present invention. In this embodiment, the electronic apparatus 100 is a portable Global Navigation Satellite System (GNSS) receiver (e.g., a GPS receiver), and includes, but is not limited to, a signal processing device 102, a wireless communication device 104, and a controller 106. Additionally, the signal processing device 102 is implemented for performing a predetermined signal processing operation, and includes, but is not limited to, an RF module 112 for receiving RF signals S_RF from satellites, a baseband module 114 for converting the received RF signals S_RF into baseband signals S_BB for following signal processing, and a navigation engine 116 for processing the baseband signals S_BB for obtaining information associated with the global navigation satellite system and computing the desired positioning information. It should be noted that the RF module 112 could be an internal module disposed inside a housing of the electronic apparatus 100 or an external module disposed outside the housing of the electronic apparatus 100.

The wireless communication device 104 is implemented to establish a wireless connection 126 for communicating with an external wireless communication device 124. For example, the external wireless communication device 124 is disposed in a navigation application device (e.g., a PDA, a cellular phone, or any electronic device supporting navigation function). When the wireless connection 126 is successfully established between the wireless communication device 104 and the external wireless communication device 124, the signal processing device 102 can deliver the computed positioning information to the external wireless communication device 124. In this embodiment, the wireless communication device 104 and the external wireless communication device 124 both comply with the Bluetooth specification. However, this is for illustrative purpose only, and is not meant to a limitation of the present invention.

The controller 106 is coupled to the signal processing device 102 and the wireless communication device 104, and is designed for selectively enabling or disabling the power saving functionality of the electronic apparatus 100 according to a connection status of the wireless connection 126 between the wireless communication device 104 and the external wireless communication device 124. When the power saving functionality is activated, the electronic apparatus 100 is switched from a first operation mode (e.g., a normal operation mode) to a second operation mode (e.g., a power saving mode); on the contrary, when the power saving functionality is disabled, the electronic apparatus 100 stays in the first operation mode (i.e., the normal operation mode). It should be note that the electronic apparatus 100 operating in the second operation mode has less power consumption than the electronic apparatus 100 operating in the first operation mode. In this embodiment, the signal processing device 102 is a kernel component of the electronic apparatus 100. Therefore, the controller 106 achieves the objective of switching the electronic apparatus 100 between the first operation mode and the second operation mode by switching the signal processing device 102 between a first mode and a second mode, where the signal processing device 102 operating in the second mode has less power consumption than the signal processing device 102 operating in the first mode. The operation of switching the electronic apparatus 100 between the first operation mode and the second operation mode is detailed as below.

Figure 2:
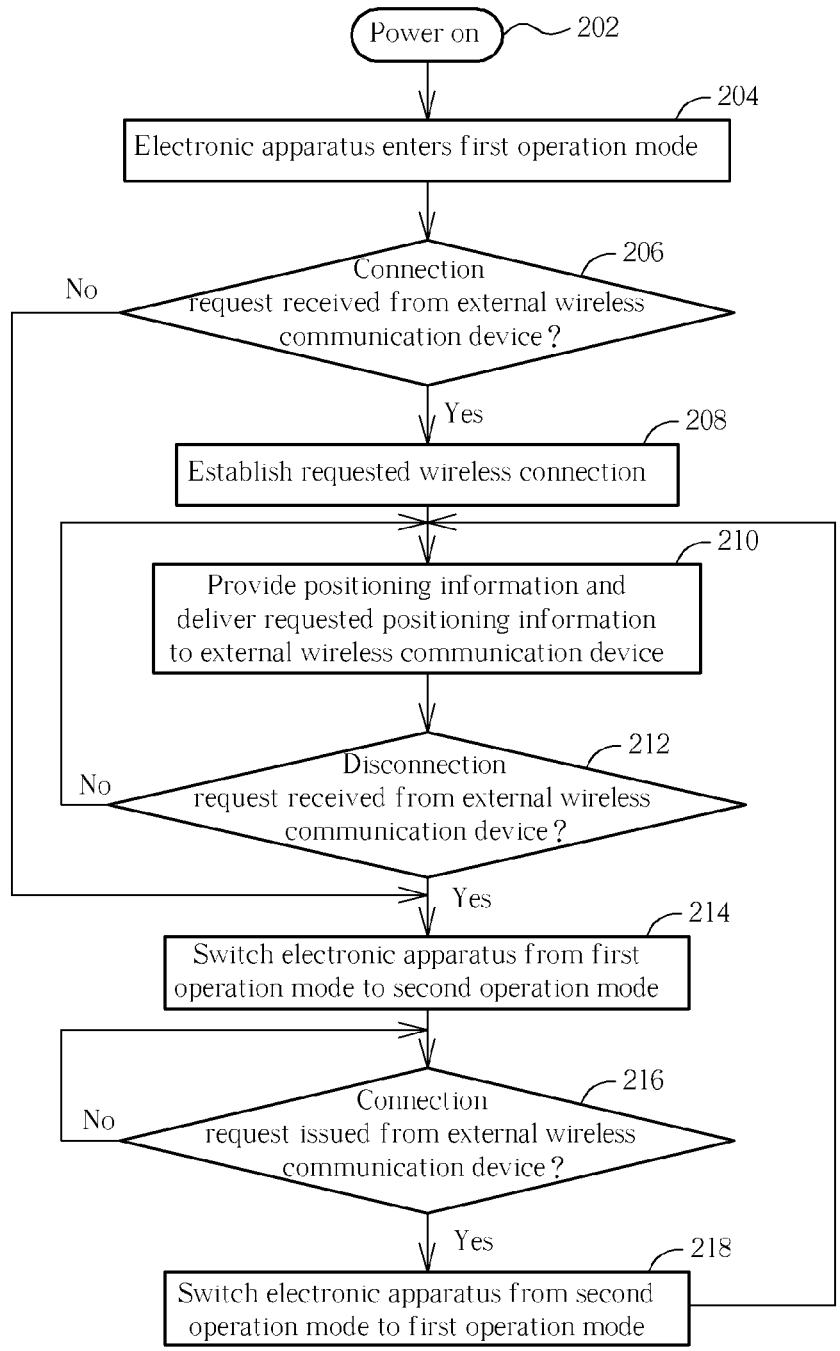
FIG. 2 is a flowchart illustrating a method of controlling the electronic apparatus shown in FIG. 1 according to an exemplary embodiment of the present invention.

Please refer to FIG. 2 in conjunction with FIG. 1. FIG. 2 is a flowchart illustrating a method of controlling the electronic apparatus 100 shown in FIG. 1 according to an exemplary embodiment of the present invention. Provided that the result is substantially the same, the steps are not limited to be executed in the exact order shown in FIG. 2. The exemplary flow of selectively enabling or disabling the power saving functionality is as below:

Step 202: Power on the electronic apparatus 100.
Step 204: The electronic apparatus 100 enters a first operation mode (i.e., a normal operation mode).
Step 206: Does the wireless communication device 104 receive a connection request from the external wireless communication device 124? If yes, go to step 208; otherwise, go to step 214.
Step 208: Establish the requested wireless connection 126 between the wireless communication device 104 and the external wireless communication device 124.
Step 210: The signal processing device 102 provides the positioning information, and the wireless communication device 104 delivers the requested positioning information from the signal processing device 102 to the external wireless communication device 124.
Step 212: Does the wireless communication device 104 receive a disconnection request from the external wireless communication device 124? If yes, go to step 214; otherwise, go to step 210.
Step 214: Switch the electronic apparatus 100 from the first operation mode (i.e., the normal operation mode) to a second operation mode (i.e., a power saving mode).
Step 216: The wireless communication device 104 keeps monitoring if a connection request is issued from the external wireless communication device 124? If the connection request is received, go to step 218; otherwise, return to step 216 to keep detecting if there is any connection request from the external wireless communication device 124.
Step 218: Switch the electronic apparatus 100 from the second operation mode (i.e., the power saving mode) to the first operation mode (i.e., the normal operation mode). Go to step 210.

In this embodiment, when the electronic apparatus 100 is powered on, the electronic apparatus 100 first enters the first operation mode (steps 202 and 204). In the first operation mode, the circuit components of the signal processing device 102, including the signal processing device 102, the wireless communication device 104 and the controller 106, are all activated and operated at full speed. Therefore, each of the signal processing device 102, the controller 106, and the wireless communication device 104 enters the normal operation mode to perform its dedicated function. For example, the signal processing device 102 starts obtaining information associated with the global navigation satellite system according to received satellite signals and computing the desired positioning information (NMEA data) required by an external navigation application device. If the user of the external navigation application does not enable the navigation function, the external wireless communication device 124 installed on the navigation application device does not ask the wireless communication device 104 to establish the wireless connection 126 for data transaction. In a case where the wireless communication device 104 receives a connection request from the external wireless communication device 124 for establishing the wireless connection 126 after the electronic apparatus 100 is powered on, the requested wireless connection 126 is established (steps 206 and 208). Additionally, when receiving the connection request from the external wireless communication device 124, the wireless communication device 104 also notifies the controller 106. As the notification is indicative of the connection status of the wireless connection 126 between the wireless communication device 104 and the external wireless communication device 124, the controller 106 then knows that the wireless connection 126 is requested for transmitting the positioning information determined by the signal processing device 102. Therefore, the controller 106 does not control the signal processing device 102 to switch from a first mode (e.g., a normal operation mode) to a second mode (e.g., a power saving mode). As the signal processing device 102 is operated in the normal operation mode now, the computed positioning information is delivered to the external wireless communication device 124 through the wireless communication device 104 and the established wireless connection 126 (step 210). In other words, in the first operation mode the electronic apparatus 100 works in a typical way.

However, when the user of the external navigation application device turns off the navigation function after the wireless connection 126 is established, the external wireless communication device 124 will issue a disconnection request for closing the wireless connection 126 as the external navigation application device does not need the positioning information for navigation. After receiving the disconnection request from the external wireless communication device 124, the wireless connection 126 is closed and the electronic apparatus 100 leaves the first operation mode and enters the second operation mode (steps 212 and 214). As stated above, the electronic apparatus 100 in the second operation mode (i.e., the power saving mode) has less power consumption than the electronic apparatus 100 operating in the first operation mode. To lower the power consumption, many power saving techniques can be applied to the electronic apparatus 100. Some examples are given as below.

When the wireless communication device 104 closes the wireless connection 126 in response to the disconnection request from the external wireless communication device, the wireless communication device 104 notifies the controller 106 of the disconnection between the wireless communication device 104 and the external wireless communication device 124. As the connection status of the wireless connection 126 notified by the wireless communication device 104 indicates that the positioning information is not requested by any external devices, the controller 106 controls the signal processing device 102 to switch from the first mode (i.e., the normal operation mode) to the second mode (i.e., the power saving mode), where the signal processing device 102 operating in the power saving mode has less power consumption than the signal processing device 102 operating in the normal operation mode. Please note that switching the signal processing device 102 to the power saving mode is not limited to control all of the circuit components to enter the power saving mode. Any configurations capable of making the signal processing device 102 consume less power all obey the spirit of the present invention. For example, in one exemplary embodiment, the controller 106 turns off all circuit components within the signal processing device 102 when the signal processing device 102 is controlled to enter the power saving mode, thereby reducing the power consumption greatly. In another exemplary embodiment, the controller 106 turns off certain circuit components in the signal processing device 102 when the signal processing device 102 is switched to the power saving mode. For instance, at least one of the RF module 112, the baseband module 114, and the navigation engine 116 is powered off. The same objective of reducing power consumption is achieved.

Additionally, to reduce more power consumption when the electronic apparatus 100 stays in the power saving mode, the wireless communication device 104 is also switched from the first mode (i.e., the normal operation mode) to the second mode (i.e., a standby mode) for monitoring if there is any connection request from the external wireless communication device 124. It should be note that the wireless communication device 104 in the standby mode has less power consumption than the wireless communication device 104 operating in the normal operation mode. Furthermore, as mentioned above, the wireless communication device 104 is implemented by a Bluetooth module, which supports a sniff mode according to the Bluetooth specification. In other words, when the signal processing device 102 enters the power saving mode, the wireless communication device 104 is active and stays in the sniff mode to keep monitoring if there is any connection request. As the sniff mode is clearly defined in the Bluetooth specification and well known to those skilled in this art, further description is omitted for brevity.

To further reduce the power consumption when the electronic apparatus 100 stays in the second operation mode (i.e., the power saving mode), the controller 106 also transits from the first mode (i.e., the normal operation mode) to the second mode (i.e., the power saving mode) for receiving notification indicative of the connection status of the wireless connection from the wireless communication device 104. In this embodiment, when the signal processing device 102 enters the power saving mode, the controller 106 in the power saving mode is active and runs at slower clock rate.

The above examples are for illustrative purposes only, and are not meant to be limitations of the present invention. For example, in one alternative design, the wireless communication device 104 can stay in the normal operation mode when the electronic apparatus 100 is controlled to enter the power saving mode; and in another alternative design, the controller 106 can stay in the normal operation mode when the electronic apparatus 100 is controlled to enter the power saving mode. Furthermore, after reading above disclosure, a skilled person can readily appreciate that the electronic apparatus 100 is allowed to adopt any available conventional power saving schemes to consume less power when there is no external device requesting the electronic apparatus 100 for positioning information. For example, the data access number/frequency of a memory device (not shown) is reduced when the power saving functionality is activated. Without departing the spirit of the present invention, any alternative designs all fall in the scope of the present invention.

As stated above, when the electronic apparatus 100 is in the power saving mode, the wireless communication device 104 and the controller 106 are not turned off. That is, the wireless communication device 104 stays in the standby mode to monitor any connection request from the external wireless communication device 124, and the controller 106 runs at slower clock rate to receive notification indicative of the connection status of the wireless connection from the wireless communication device 104. When the wireless communication device 104 receives a connection request from the external wireless communication device 124, meaning that the user of the external navigation application device enables the navigation function, the electronic apparatus 100 leaves the power saving mode and enters the normal operation mode (steps 216 and 218). In this embodiment, when notified by the wireless communication device 104, the controller 106 controls the signal processing device 102 to leave the power saving mode and enters the normal operation mode. In addition, the wireless communication device 104 leaves the standby mode and enters the normal operation mode, if the wireless communication device 104 is switched to the standby mode when the electronic apparatus 100 enters the power saving mode; similarly, the controller 106 leaves the power saving mode and enters the normal operation mode to run at full speed, if the controller 106 runs at slower clock rate when the electronic apparatus 100 enters the power saving mode. In this way, the electronic apparatus 100 is switched to the normal operation mode again to achieve optimum performance.

In step 206, if the wireless communication device 104 does not receive any connection request from the external wireless communication device 124 for establishing the wireless connection 126 after the electronic apparatus 100 is powered on, the electronic apparatus 100 will enter the second operation mode (i.e., the power saving mode) to reduce power consumption. As the power saving operation has been detailed above, further description is omitted here for the sake of brevity.

As one can see, step 212 is performed when the electronic apparatus 100 stays in the first operation mode to monitor if the wireless connection is closed; similarly, step 216 is performed when the electronic apparatus 100 stays in the second operation mode to monitor if the wireless connection is established. Therefore, steps 210-218 define a procedure for switching the electronic apparatus 100 between the first operation mode and the second operation mode according to the connection status of the wireless connection. In this way, the power consumption can be reduced by forcing the electronic apparatus 100 to enter the power saving mode when there is no external device requesting the signal processing device 102 for its output data, such as the positioning information.

Please note that the disclosed power saving scheme is not limited to be applied to a GNSS receiver (e.g., a GPS receiver). The same technique of selectively enabling or disabling the power saving functionality according to connection status of a wireless connection can be applied to any electronic apparatus with wireless communication capability. This still obeys the spirit of the present invention.

Those skilled in the art will readily observe that numerous modifications and alterations of the device and method may be made while retaining the teachings of the invention.

What is claimed is:

1. An electronic apparatus with power saving functionality, comprising:
    a signal processing device, configured for performing a predetermined signal processing operation;
    a wireless communication device, coupled to the signal processing circuit, for communicating with an external wireless communication device through a wireless connection; and
    a controller, coupled to the signal processing device and the wireless communication device, for switching the signal processing device between a first mode and a second mode according to a connection status of the wireless connection between the wireless communication device and the external wireless communication device, wherein the signal processing device operating in the second mode has less power consumption than the signal processing device operating in the first mode.

2. The electronic apparatus of claim 1, being a portable apparatus.

3. The electronic apparatus of claim 2, wherein the portable apparatus is a Global Navigation Satellite System (GNSS) receiver.

4. The electronic apparatus of claim 3, wherein when the wireless connection is not established between the wireless communication device and the external wireless communication device, the signal processing device is controlled to enter the second mode; and when the wireless connection is established between the wireless communication device and the external wireless communication device, the signal processing device is controlled to enter the first mode.

5. The electronic apparatus of claim 3, wherein the signal processing device comprises at least a circuit component selected from a group consisting of an RF module, a baseband module, and a navigation engine; and when the signal processing device enters the second mode, the circuit component is controlled to enter the second mode, where the circuit component operating in the second mode has less power consumption than the circuit component operating in the first mode.

6. The electronic apparatus of claim 3, wherein the wireless communication device complies with a Bluetooth specification.

7. The electronic apparatus of claim 3, wherein when the signal processing device enters the second mode, the wireless communication device enters the second mode to keep monitoring if there is a connection request issued from the external wireless communication device; and the wireless communication device operating in the second mode has less power consumption than the wireless communication device operating in the first mode.

8. The electronic apparatus of claim 3, wherein when the signal processing device enters the second mode, the controller enters the second mode to receive notification indicative of the connection status of the wireless connection from the wireless communication device; and the controller operating in the second mode has less power consumption than the controller operating in the first mode.

9. A method of controlling an electronic apparatus, comprising:
    monitoring a connection status of a wireless connection between the electronic apparatus and an external wireless communication device; and
    switching the electronic apparatus between a first operation mode and a second operation mode according to the connection status of the wireless connection between the electronic apparatus and the external wireless communication device, wherein the electronic apparatus operating in the second operation mode has less power consumption than the electronic apparatus operating in the first operation mode.

10. The method of claim 9, wherein the electronic apparatus is a portable apparatus.

11. The method of claim 10, wherein the portable apparatus is a Global Navigation Satellite System (GNSS) receiver.

12. The method of claim 11, wherein the step of switching the electronic apparatus between the first operation mode and the second operation mode comprises:
    when the wireless connection is not established, controlling the electronic apparatus to enter the second operation mode; and
    when the wireless connection is established, controlling the electronic apparatus to enter the first operation mode.

13. The method of claim 11, wherein the electronic apparatus comprises at least a circuit component selected from a group consisting of an RF module, a baseband module, and a navigation engine; and the step of switching the electronic apparatus between the first operation mode and the second operation mode comprises:
    when controlling the electronic apparatus to enter the second operation mode from the first operation mode, controlling the circuit component to enter a second mode from a first mode, where the circuit component operating in the second mode has less power consumption than the circuit component operating in the first mode.

14. The method of claim 11, wherein the wireless connection complies with a Bluetooth specification.

15. The method of claim 11, wherein the electronic apparatus comprises a wireless communication device for establish the wireless connection; and the step of switching the electronic apparatus between the first operation mode and the second operation mode further comprises:
    when controlling the electronic apparatus to enter the second operation mode from the first operation mode, controlling the wireless communication device to enter a second mode from a first mode to keep monitoring if there is a connection request issued from the external wireless communication device, where the wireless communication device operating in the second mode has less power consumption than the wireless communication device operating in the first mode.

16. The method of claim 11, wherein the electronic apparatus comprises a controller for switching the electronic apparatus between the first operation mode and the second operation mode; and the step of switching the electronic apparatus between the first operation mode and the second operation mode further comprises:
    when controlling the electronic apparatus to enter the second operation mode from the first operation mode, controlling the controller to enter a second mode from a first mode for receiving notification indicative of the connection status of the wireless connection, where the controller operating in the second mode has less power consumption than the controller operating in the first mode.

* * * * *